United States Patent [19]

Kudo

[11] Patent Number: 4,898,417
[45] Date of Patent: Feb. 6, 1990

[54] STRUCTURE FOR COVERING SEAT SLIDE LEGS

[75] Inventor: Hiroaki Kudo, Ayase, Japan

[73] Assignee: Ikeda Bussan Co., Ltd., Ayase, Japan

[21] Appl. No.: 199,346

[22] Filed: May 26, 1988

[30] Foreign Application Priority Data

May 28, 1987 [JP] Japan .............................. 62-79863[U]
May 28, 1987 [JP] Japan .............................. 62-79866[U]

[51] Int. Cl.$^4$ ................................................. B60N 3/04
[52] U.S. Cl. .................................. 296/97.23; 296/39.1
[58] Field of Search ............................. 296/97.23, 39.1

[56] References Cited

U.S. PATENT DOCUMENTS 2,909,234 10/1959 Belk .............................. 296/97.23 X
2,970,860 2/1961 Belk .............................. 296/97.23 X

FOREIGN PATENT DOCUMENTS 0002445 of 1908 United Kingdom ............. 296/97.23

Primary Examiner—Margaret A. Focarino
Assistant Examiner—Andrew C. Pike
Attorney, Agent, or Firm—Foley & Lardner, Schwartz, Jeffery, Schwaab, Mack, Blumenthal & Evans

[57] ABSTRACT

A structure is described for covering slide legs of seat slides attached to a floor panel through openings which are formed in a floor carpet placed on the floor panel. Portions of the floor carpet which correspond to the slide legs attached to the floor panel are swelled upward to form cover portions each having a wall erected toward the seat slide. Each erected wall is cut off or cutting is applied to three sides of the erected wall at each of the cover sections, leaving one side thereof not cut so as to enable the erected wall portion to be folded downward along the uncut side onto the back face of the floor carpet. The bottom edges of both side faces of each of the cover portions are cut to open both side faces. These side faces are inserted under the back face of the floor carpet after the slide legs are attached to the floor panel.

16 Claims, 5 Drawing Sheets

STRUCTURE FOR COVERING SEAT SLIDE LEGS

BACKGROUND OF THE INVENTION

1. Field of the Invention

The present invention relates to a structure for covering seat slide legs attached to the floor panel.

2. Prior Art

The car seat is usually provided with seat slides under it and fixed on the floor panel, on which the floor carpet is placed, at a certain position thereof through slide legs.

Conventionally, the floor carpet 4 was only provided with openings 5 at those positions thereof which corresponded to the slide legs 1 of the car seat, so as to enable the slide legs 1 to be attached to the floor panel 2 at these openings 5 by bolts 3, as shown in FIG. 1. Alternatively, the slide leg 1 was attached to the floor panel 2 through the opening 5 of the floor carpet 4 by means of the bolt 3, holding a spacer 6 between the slide leg 1 and the floor panel 2, as shown in FIGS. 2 and 3.

When the floor carpet 4 was only provided with the openings 5 through which the slide legs 1 were attached to the floor panel 2, however, the bolts 3, the floor panel 2 and the like were exposed to spoil the appearance of the car interior.

When the slide legs 1 were fixed on the floor carpet 2 holding the spacer 6 between the leg 1 and the floor panel 2, the goal can be achieved in covering the openings 5, the floor panel 2 and the like, but the bolts 3 sometimes loosened as time went by because the slide legs 1 were fixed on the panel 2 through the carpet 4. In addition, the number of parts used became larger and the cost was thus made higher because the spacers 6 must be used as additional members. Further, those portions of the floor panel 2 on which the slide legs 1 were fixed, and the bolts 3 were left uncovered, damaged the appearance of the car interior.

SUMMARY OF THE INVENTION

A first object of the present invention is to provide a simpler structure for more easily covering seat slide legs attached to the floor panel.

A second object of the present invention is to provide a structure, lower in cost, for covering seat slide legs to enhance the beauty of appearance of the car interior.

In order to achieve these and other objects of the present invention, there can be provided a structure for covering slide legs of seat slides which are attached to the floor panel through openings of the floor carpet. The openings are so made that those portions of the floor carpet which correspond to the slide legs attached to the floor panel are swelled upward to form pentahedron-shaped cover portions each having an erected side directed toward the seat slide. The erected side is cut off, or three edges of the side are cut and the erected side is then bent downward along another edge. Two sides of the cover portions are also cut along bottom edges thereof and are introduced under the carpet after each of the slide legs is attached to the floor panel.

When the cover portion is formed in the abovedescribed manner, the slide legs can be easily covered by the sides introduced under the floor carpet after the slide legs are attached to the floor panel.

According to a second embodiment of the present invention, tetrahedron-shaped cover portions each have an erected side directed toward the seat slide. The erected side is cut off, or two edges of the side are cut and the erected side is then bent downward along another edge. Two sides of the cover portions are cut along a common edge thereof to form two flaps for covering the slide legs.

According to the second embodiment of the present invention, the slide legs can be easily covered by two flaps overlapped on the slide legs after the slide legs are attached to the floor panel.

Therefore, the slide legs can be covered more simply and more accurately without losing the beauty of appearance of the car interior and using no additional parts, thereby enabling the cost to be made lower.

DETAILED DESCRIPTION OF THE PREFERRED EMBODIMENTS

An embodiment of the present invention will be described with reference to the accompanying drawings.

Figure 1:
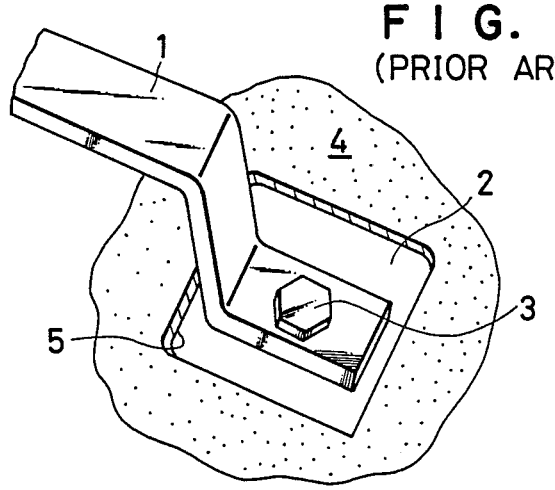
FIG. 1 is a perspective view showing how the conventional slide leg is attached.
Figure 2:
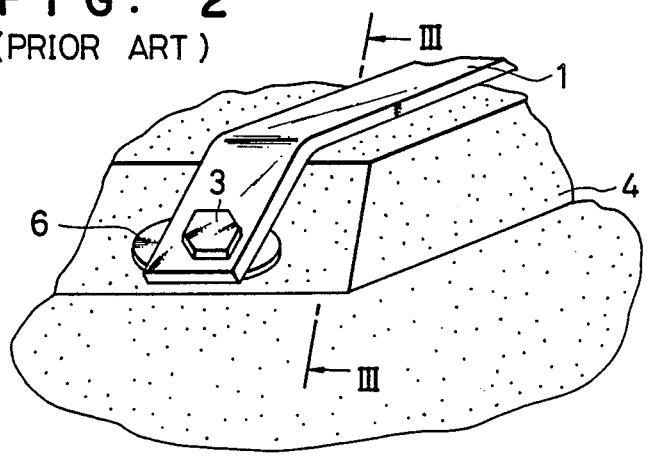
FIG. 2 is a perspective view showing how the other conventional slide leg is attached.
Figure 3:
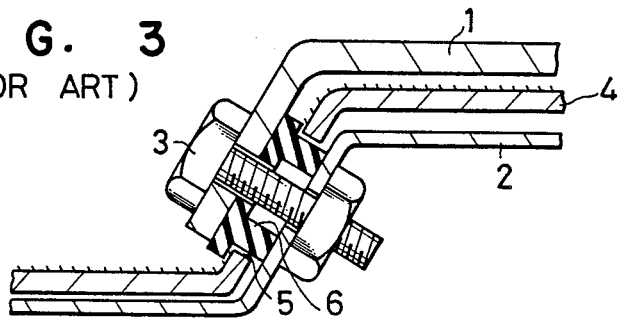
FIG. 3 is a sectional view taken along a line III—III in FIG. 2.
Figure 4:
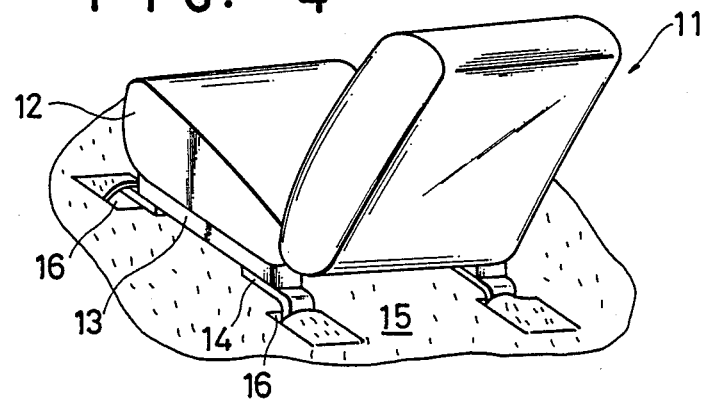
FIG. 4 is a perspective view showing the car seat to which a first embodiment of the slide leg covering structure according to the present invention is applied.

FIGS. 4 through 8 show a first embodiment of the present invention. As shown in FIG. 4, a car seat 11 has a pair of seat slides 13 arranged under a seat cushion 12 and is fixed to a floor panel 16, on which a floor carpet 15 is placed, at a certain position thereof through slide legs 14.

Figure 5:
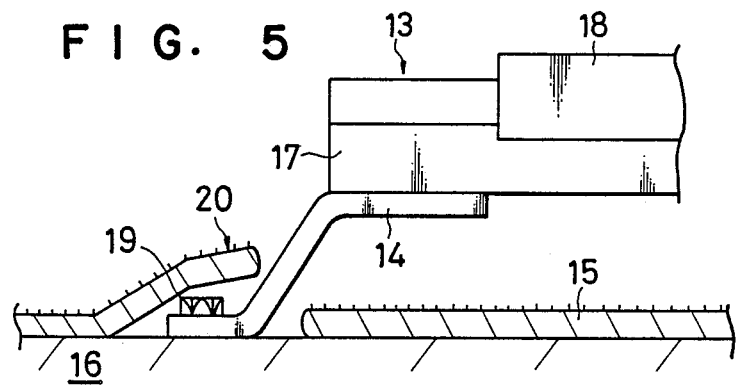
FIG. 5 is a sectional view showing how the slide leg for the car seat is attached in the case of the embodiment shown in FIG. 4.

The seat slide 13 comprises a lower rail 17 and an upper rail 18 slidably fitted onto the lower rail 17, and the slide legs 14 attached to front and back ends of the lower rail 17 are fixed to the floor panel 16 by bolts 19, as shown in FIG. 5. Cover portions 20 for covering the slide legs 14 are formed integral to the floor carpet 15 at those portions thereof which correspond to the slide legs 14 attached to the floor panel 16.

Figure 6:
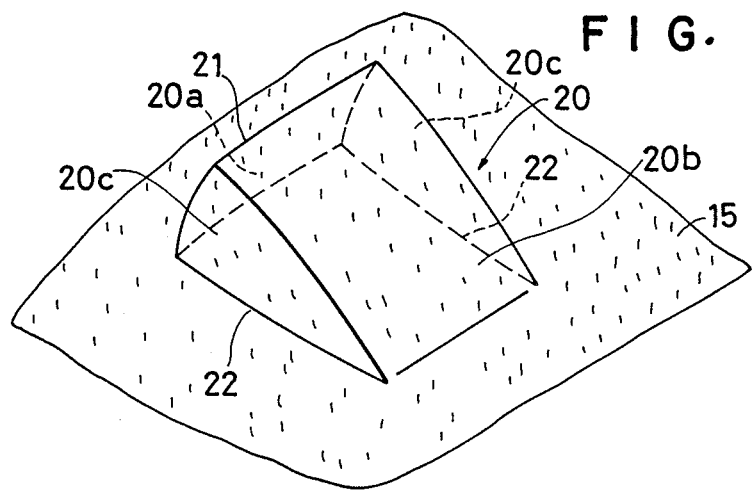
FIG. 6 is a perspective view showing a cover portion of the floor carpet.

As shown in FIG. 6, each of the cover portions 20 is formed by swelling the floor carpet 15 upward in a pentahedron shape, having a front side 20a slightly slanted backward, an upper side 20b extending from an upper edge of the front side 20a to the level of the floor panel 16, and triangular sides 20c. The front side 20a is directed toward the seat slide 13.

Figure 7:
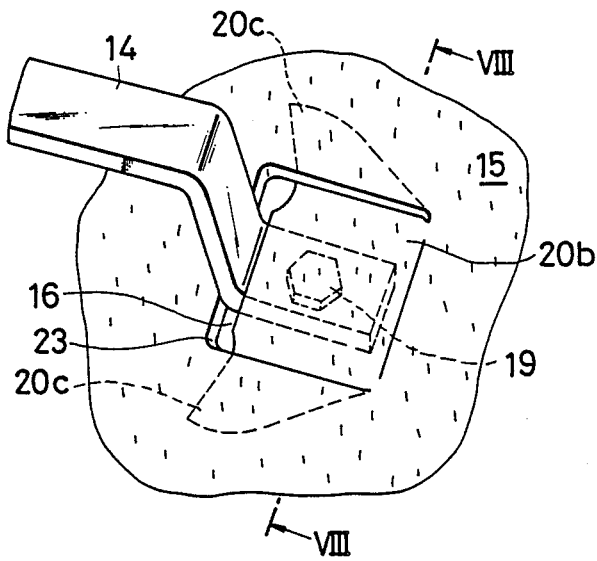
FIG. 7 is a perspective view showing the slide leg covered by the cover portion shown in FIG. 6.

Using a cutting tool, cutting is applied along a circumferential rim 21 of the front side 20a at each of the cover portions 20 to cut off the front side 20a. Cutting is further applied to a bottom edge 22 of each of the sides 20c. The upper side 20b is then opened upward to form an opening 23 and the slide leg 14 is fixed on the floor panel 16 by means of the bolt 19 through the opening 23, while both sides 20c are inserted under a back face of the floor carpet 15, passing through the opening 23 of the floor carpet 15, to cover that portion of the slide leg 14 at which the bolt 13 is positioned, as shown in FIGS. 7 and 8.

Figure 8:
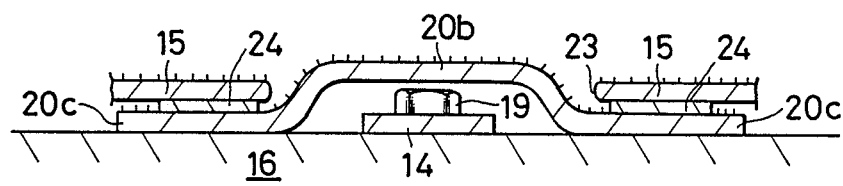
FIG. 8 is a sectional view taken along a line VIII—VIII in FIG. 7.

Both sides 20c of each of the cover portions 20 may be inserted under the back face of the floor carpet 15 and then securely fixed to the back face thereof by means of fastening strips 24, as shown in FIG. 8.

Rim treatment such as knitting or coating may be applied to the rims of the cover portion 20 and openings 23 to prevent these rims from unravelling. The cover portion 20 may be formed by swelling the floor carpet 16 like such a shape as formed when a cylinder is obliquely sectioned, or other shapes. Cutting may be applied to three edges of the front side 20a but leaving that edge thereof not cut which is the border between the front side 20a and the upper side 20b, and the front side 20a may be then bent downward under a back face of the upper side 20b. It may otherwise be arranged that a bottom edge of the front side 20a is left uncut and that the front side 20a is then bent downward along this bottom edge and under the back face of the floor carpet 15.

FIGS. 9 through 13 show a second embodiment of the present invention. In the case of this embodiment similar to the one shown in FIG. 4, the car seat 1 has a pair of seat sliders 13 arranged under the seat cushion 12 and is fixed on the floor panel 16, on which the floor carpet 15 is placed, at a certain position thereof through slide legs 14 attached to the seat slides 13.

Figure 9:
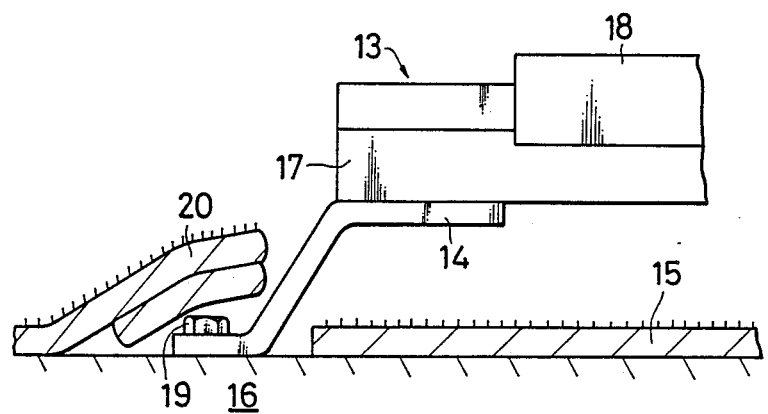
FIG. 9 is a sectional view showing how the slide leg for the car seat is attached in the case of a second embodiment of the slide leg covering structure according to the present invention.
Figure 10:
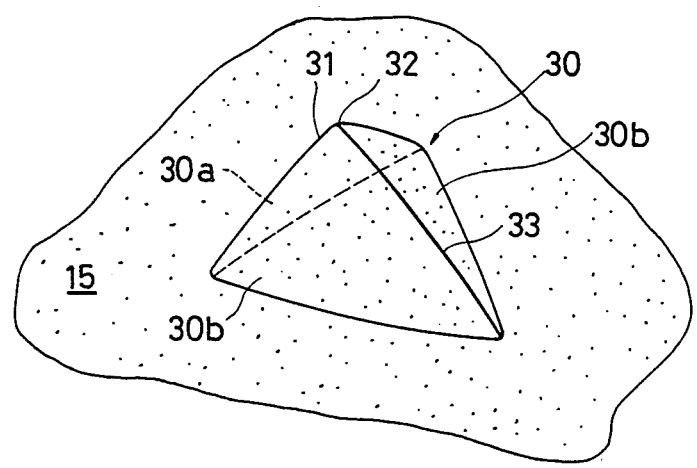
FIG. 10 is a perspective view showing a cover portion of the floor carpet.

As shown in FIG. 9, the seat slide 13 comprises the lower rail 17 and the upper rail 18 slidably fitted onto the lower rail 17, and the slide legs 14 attached to the front and back ends of the lower rail 17 are fixed on the floor panel 16 by means of the bolts 19. Cover portions 30 for covering the slide legs 14 are formed integral to the floor carpet 15 at those positions thereof which correspond to the slide legs 14 attached to the floor panel 16.

Each of the cover portions 30 is formed by swelling the floor carpet 15 upward in a tetrahedron shape having a front side 30a like an isosceles triangle slightly slanted backward, and triangular sides 30b adjacent to this front side 30a. The front side 30a is directed toward the seat slide 13.

Figure 11:
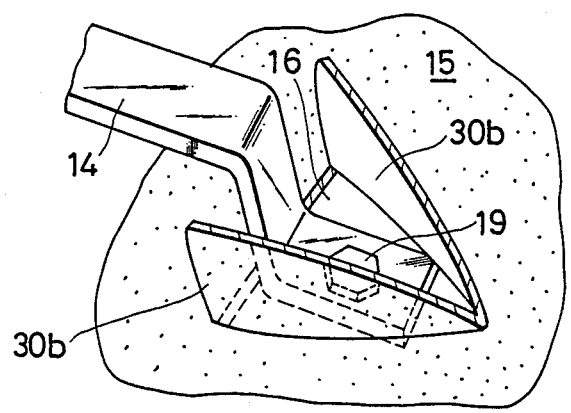
FIG. 11 is a perspective view showing the cover portion cut and opened.
Figure 12:
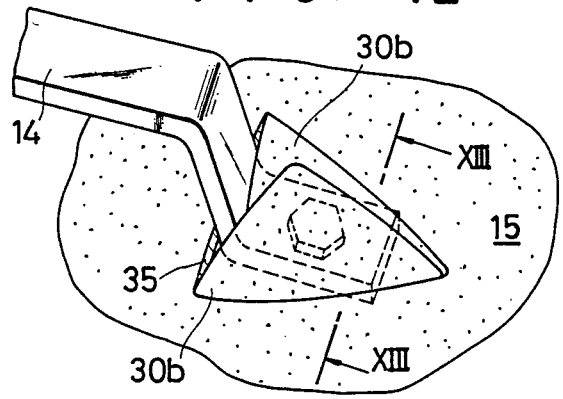
FIG. 12 is a perspective view showing the slide leg covered by the cover portion.

Using a cutting tool, cutting is applied to a circumferential rim 31 of the front side 30a to cut it off. Cutting is further applied along a line connecting between an apex 32 of the front side 30a and a common edge 33 of the adjacent sides 30b to make the sides 30b as flaps. The adjacent sides or flaps 30b are then bent opened and the slide leg 14 is fixed on the floor panel 16 by means of the bolt 19, as shown in FIG. 11. The sides 30b are then overlapped one upon the other to cover that portion of the slide leg 14 at which the bolt 19 is positioned, as shown in FIG. 12.

Figure 13:
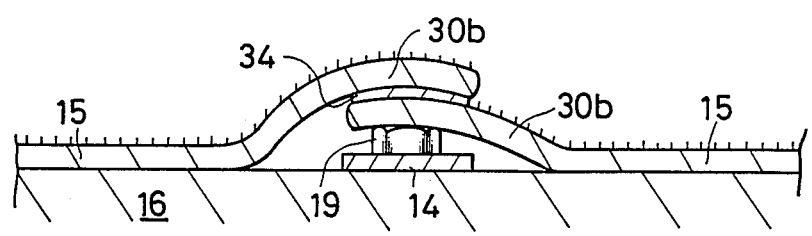
FIG. 13 is a sectional view taken along a line XIII—XIII in FIG. 12.

It may be arranged that the flaps 30b of each of the cover portions 30 are overlapped one upon the other on the bolt-attached portion of the slide leg 14 and then securely fixed to each other by means of fastening strips 34, as shown in FIG. 13.

Rim treatment such as knitting or coating may be applied to the rims of the cover portions 30 and openings 35 which have been formed by cutting the floor carpet 15 as described above, thereby preventing these rims from unravelling. The cover portions 30 may be formed by swelling the carpet 15 upward like such a shape as formed when a cylinder is obliquely sectioned, or like other shapes such as a rectangular solid. Cutting may be applied to two edges of the front side 30a but leaving a bottom edge thereof uncut so that the front side 30a can be folded toward the back face of the carpet 15.

Although some preferred embodiments of the present invention have been described, it should be understood that the present invention is not limited to the above-described embodiments and that various changes and modifications can be made without departing from the spirit and scope of the present invention.

I claim:

1. A structure for covering slide legs of seat slides attached to a floor panel through openings which are formed in a floor carpet placed on the floor panel, said structure comprising:
   portions of said floor carpet which correspond to the slide legs attached to the floor panel, said portions being swelled upward to form pentahedron-shaped cover portions, each cover portion having a space facing toward a respective seat slide, wherein said space of each cover portion is formed when an erected side of each cover portion facing the respective seat slide is cut off, two sides of the cover portion adjacent to said space are cut along bottom edges thereof to open said two sides, and said two sides are inserted under the floor carpet after the slide legs are attached to the floor panel.

2. A structure for covering slide legs according to claim 1 wherein fastening strips are interposed between the floor carpet and said two sides of said cover portions which are inserted under the floor carpet.

3. A structure for covering slide legs according to claim 1 wherein rim treatment is applied to rims of said cover portions to prevent said rims from unravelling.

4. A structure for covering slide legs according to claim 1 wherein rim treatment is applied to rims of said openings to prevent said rims from unravelling.

5. A structure for covering slide legs of seat slides attached to a floor panel through openings which are formed in a floor carpet placed on the floor panel, said structure comprising:
   portions of said floor carpet which correspond to the slide legs attached to the floor panel being swelled upward to form pentahedron-shaped cover portions, each cover portion having a side erected toward a respective seat slide and two other sides, each of said two sides being adjacent to said erected side, wherein all but one edge of said erected side of each of said cover portions are cut, said erected side is folded along the one uncut edge of said erected side and inserted under the floor carpet, said two sides are cut along bottom edges thereof to open said two sides, and said two sides are inserted under the floor carpet after the slide legs are attached to the floor panel.

6. A structure for covering slide legs according to claim 5 wherein fastening strips are interposed between the floor carpet and said two sides of said cover portions which are inserted under the floor carpet.

7. A structure for covering slide legs according to claim 5 wherein rim treatment is applied to rims of said cover portions to prevent said rims from unravelling.

8. A structure for covering slide legs according to claim 5 wherein rim treatment is applied to rims of said openings to prevent said rims from unravelling.

9. A structure for covering slide legs of seat slides attached to a floor panel through openings which are formed in a floor carpet placed on the floor panel, said structure comprising:

portions of said floor carpet which correspond to the slide legs attached to the floor panel being swelled upward to form tetrahedron-shaped cover portions, each cover portion having a space facing a respective seat slide and two sides adjacent to said space, wherein the space of each cover portion is formed when an erected side of said portion facing the respective seat slide is cut off, and said two adjacent sides of the portion are cut along a common edge thereof to form flaps and overlapped one upon the other on the corresponding slide leg after the slide legs are attached to the floor panel through the flaps which have been cut open.

10. A structure for covering slide legs according to claim 9 wherein fastening strips are interposed between said both flaps which are overlapped one upon the other on the slide legs.

11. A structure for covering slide legs according to claim 9 wherein rim treatment is applied to rims of said cover portions to prevent said rims from unravelling.

12. A structure for covering slide legs according to claim 9, wherein rim treatment is applied to rims of said openings to prevent said rims from unravelling.

13. A structure for covering slide legs of seat slides attached to a floor panel through openings which are formed in a floor carpet placed on the floor panel, said structure comprising:

portions of said floor carpet which correspond to the slide legs attached to the floor panel being swelled upward to form tetrahedron-shaped cover portions, each cover portion having a side erected toward a respective seat slide and two other sides, each of said two sides being adjacent to said erected side, wherein two edges of said erected side are cut, said erected side is folded along an uncut edge of said erected side and is inserted under the floor carpet, and said two sides are cut along a common edge thereof to form flaps and overlapped one upon the other on the corresponding slide leg after the slide legs are attached to the floor panel through the flaps which have been cut open.

14. A structure for covering slide legs according to claim 13 wherein fastening strips are interposed between said both flaps which are overlapped one upon the other on the slide legs.

15. A structure for covering slide legs according to claim 13 wherein rim treatment is applied to rims of said cover portions to prevent said rims from unravelling.

16. A structure for covering slide legs according to claim 13 wherein rim treatment is applied to rims of said openings to prevent said rims from unravelling.

* * * * *